United States Patent [19]
Krause

[11] 3,864,701
[45] Feb. 4, 1975

[54] AUTOMATIC EXPOSURE CONTROL CIRCUIT

[75] Inventor: Gerhard Krause, Edersberg, Germany

[73] Assignee: Siemens Aktiengesellschaft, Berlin and Munich, Germany

[22] Filed: Mar. 2, 1973

[21] Appl. No.: 337,727

[30] Foreign Application Priority Data
Mar. 7, 1972 Germany............................ 2210958

[52] U.S. Cl.................... 354/49, 354/29, 354/38, 354/44, 354/50, 354/51, 354/59
[51] Int. Cl. ............................................. G03b 7/08
[58] Field of Search........ 95/10 CE, 10 CT; 355/68; 354/24, 29, 38, 44, 50, 51, 49, 59

[56] References Cited
UNITED STATES PATENTS
3,426,357  2/1969  Paulus................................... 355/68
3,679,905  7/1972  Watanabe........................ 95/10 CT OTHER PUBLICATIONS
"Devices & Systems at Work," Control Engineering, Feb. 1970, P. 79.
"Photo Devices Have You in the Dark," Electronic Design, Feb. 1, 1969, pp. 60-64.

Primary Examiner—John M. Horan
Assistant Examiner—Russell E. Adams, Jr.
Attorney, Agent, or Firm—Hill, Gross, Simpson, Van Santen, Steadman, Chiara & Simpson

[57] ABSTRACT

An automatic exposure control circuit for a camera employs a photo-responsive semiconductor device disposed in position to receive light emitted from a scene to be photographed through a filter wheel which is, when exposure is initiated, rotated to vary the density of the filter interposed between the photo-responsive semi-conductor and the scene to be photographed. the rising current characteristic produced by the photo-responsive semiconductor is amplified by a differential amplifier having a negative feed-back network including a low pass filter, and a positive feed-back network establishing a predetermined threshold voltage for the output of the differential amplifier. The time at which the threshold of the positive feed-back circuit is reached is dependent upon the density of light received from the scene to be photographed, and the differential amplifier produces an output pulse which is encoded in time position in correspondence to the intensity of the illumination in the scene to be photographed.

12 Claims, 2 Drawing Figures

AUTOMATIC EXPOSURE CONTROL CIRCUIT

BACKGROUND OF THE INVENTION

1. Field of the Invention

The present invention relates to an automatic exposure system for a photographic device such as a camera or the like and more particularly to an automatic exposure system in which a single photo-responsive semiconductor is employed.

2. The Prior Art

A variety of automatic exposure control systems for cameras have been developed, which operate to select an appropriate aperture for the exposure, or to select an appropriate interval during which the shutter of the camera is open, or a combination of both. While the systems developed in the past have been relatively satisfactory for relatively limited types of use, when a phototransistor is used the presence of an appreciable current, when the transistor is not exposed to light, is a source of error which interferes with proper operation of the system unless relatively cumbersome and elaborate compensation systems are employed. This is especially true at low levels of illumination. Such compensation systems are difficult to design, and often contribute additional errors of their own, especially when a pair of phototransistors are used which are not perfectly identical in their response characteristics, or in their so-called "dark cuttent" levels, or when there are variations in voltage or temperature, to which such devices are sensitive. It is therefore disirable to produce a circuit with a simpler arrangement without sacrificing accuracy of operation.

SUMMARY OF THE INVENTION

It is a principal object of the present invention to provide an automatic exposure control system for providing an output pulse, encoded in time position relative to a starting time, in response to the intensity of light received from the scene to be photographed, and means for rendering the output of such system independent of the current passed by the photo-responsive device during the period when it is not exposed to illumination.

Another object of the present invention is to provide an automatic exposure control system which is simple and economical to manufacture.

A further object of the present invention is to provide an automatic exposure control system adapted to produce an output signal consisting substantially entirely of a pulse encoded in time position, in response to the illumination received from the scene to be photographed.

These and other objects and advantages of the present invention will become manifest upon an examination of the following description and the accompanying drawings.

DESCRIPTION OF THE PREFERRED EMBODIMENT

Figure 1:
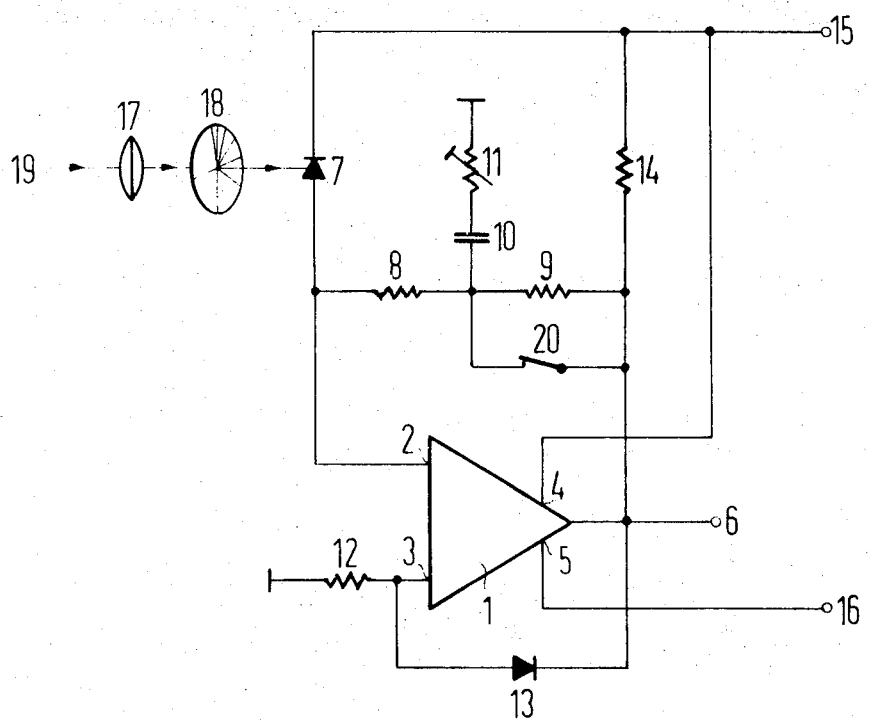
FIG. 1 is a schematic circuit diagram of an automatic exposure control system incorporating an illustrative embodiment of the present invention.

FIG. 1 illustrates in diagrammatic form a lens 17 positioned to accept light 19 from a scene to be photographed. The purpose of lens 17 is to focus the light 19 relative to a photo-responsive device 7, which is preferably a phototransistor. A filter wheel 18 is interposed in the path of the light between the lens 17 and the phototransistor 7.

The filter wheel 18 is provided with a plurality of radial zones or sectors, which differ among each other in density, so that the amount of light reaching the phototransistor 7 increases uniformly as the filter wheel 18 is rotated. The relative angle taken up by each of the sectors of the disc 18 is dimensioned inversely proportional to the angular velocity of the disc at the time that each sector is interposed in the light path between the lens 17 and the phototransistor 7, so that each sector is maintained in the light path for an equal interval of time. The angular velocity of the disc 18 is typically not constant but increases during the exposure interval and the sectors which are interposed in the path of the light beam during the earliest portion of the interval are made relatively smaller in angular dimension than those encountered during the latest portions of the exposure interval, in order to give each sector an equal time of residence within the light beam.

Figure 2:
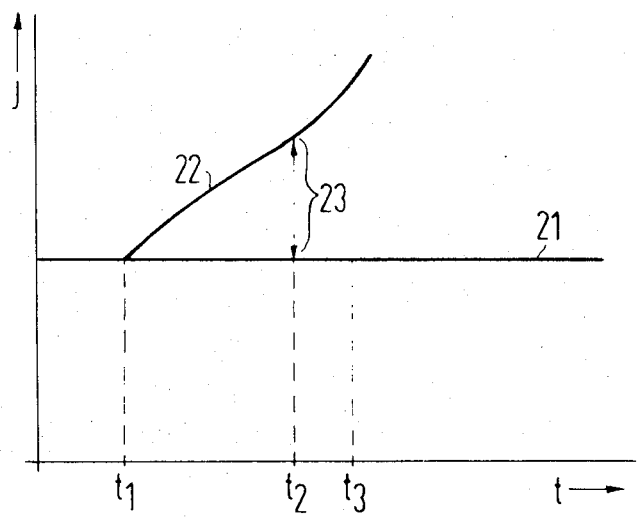
FIG. 2 is a graph of the current flowing through the photo-responsive semiconductor during operation of the apparatus of FIG. 1.

When the disc 18 is at rest, an opaque sector of the disc 18 is interposed in the beam between the lens 17 and the phototransistor 7, so that the only current which flows through the phototransistor 7 at that time is the dark current, that is, the current which flows independently of the amount of visible radiation impinging on the semiconductor unit 7. During the exposure interval, the disc 18 is rotated to bring increasingly less dense sectors into position within the light beam, so that the intensity of the light falling on the phototransistor 7 increases, and the current flowing therethrough increases in a generally linear manner. The curve 22 of FIG. 2 illustrates the relationship of the current flowing through the semiconductor unit 7 as a function of time. The quiescent level 21 is the current which flows through the phototransistor 7 when it is dark, that is, not exposed to light from the scene to be photographed. At a time t1, when exposure commences, the disc 18 begins to revolve, increasing the intensity of the illumination falling on the phototransistor 7, and bringing about a linearly increasing current characteristic as shown in FIG. 2. The phototransistor 7 is connected between a terminal 15, which is connected to a source of positive voltage, and the inverting input 2 of a differential amplifier 1. The non-inverting input 3 of the amplifier 1 is connected to ground by a resistor 12.

Power is supplied to the amplifier 1 by a line connected from a terminal 4 of the amplifier to the terminal 15, for supplying positive voltage to the amplifier 1, and another line connected between a terminal 5 of the amplifier and a terminal 16, which is connected to a negative source of voltage. The output of the differential amplifier is connected to an output terminal 6, which is adapted to be connected to a solenoid or other operating device (not shown) responsive to a signal present at the output terminal 6 for terminating the exposure of the camera.

A resistor 14 is interconnected between the output of the amplifier 1 and the terminal 15, and a negative feed-back network is interconnected between the output of the amplifier 1 and the inverting input 2. The negative feed-back network comprises a pair of series connected resistors 8 and 9, with a capacitor 10 having one terminal connected to the junction between the resistors 8 and 9 and the other terminal connected through a variable resistor 11 to ground. The feed-back circuit functions as a low pass filter, since high frequency signals are effectively shunted to ground through the resistor 11 by means of the capacitor 10. The resistor 11 is made variable in order to permit adjustment of the time constant of this circuit.

A positive feed-back circuit is provided, incorporating a diode 13, which is interconnected between the output of the amplifier 1 and the non-inverting input 3. The diode 13 has a characteristic such that the impedance of the diode is relatively large for relative small values of voltage appearing across the diode, but relatively small for larger values. The diode 13 has, therefore, a threshold value of voltage, above which the current which passes through it is relatively large compared to the current it passes when the voltage across the diode is less than the threshold level. This threshold level is referred to as the forward voltage drop of the diode and is characteristic of all conventional diodes.

In operation, the disc 18 rotates relatively rapidly from a rest position, beginning at the instant that the period of exposure begins. At this instant the terminals 15 and 16 are also connected with positive and negative voltage sources, such as the positive and negative terminals of a battery. Preferably the potential difference between the terminals 15 and 16 is about 3V.

A switch 20 is connected across the terminals of the resistor 9 and is adapted to short circuit the resistor 9 under certain conditions. More particularly, the switch 20 is normally closed as indicated in FIG. 1, but is opened approximately 5 milliseconds after the exposure period begins. The interval of 5 milliseconds is sufficient to enable the capacitor 10 to be charged to a level established by the output of the amplifier 1, which has a value related to the dark current flowing through the phototransistor 7.

When the switch 20 is opened, as the disc 18 continues to turn and the current increases through the phototransistor 7, the output voltage of the differential amplifier 1 falls linearly in response to the increasing current supplied to the inverting input 2. The feed-back network including resistors 8 and 9 is substantially non-effective because the capacitor 10 maintains the voltage level present at the junction between the resistors 8 and 9 at a substantially constant value throughout the rotation of the disc 18, because of the relatively large time constant of the circuit including the capacitor. Accordingly, the output voltage decreases as the input current increases, in accordance with the gain of the differential amplifier 1.

As the output voltage of the amplifier 1 falls, the forward voltage drop across the diode 13 increases, and eventually exceeds the threshold level of the diode 13. When this occurs the diode 13 becomes effective to supply positive feed-back to the non-inverting input 13, with a result that the output voltage produced by the differential amplifier 1 falls sharply to a minimum or saturation value. This value is maintained at the output as the capacitor 10 becomes charged to a new voltage value. As the voltage at the inverting input 2 falls to the level of the voltage at the noninverting input 3, the diode 13 becomes cut off and the output voltage returns to zero.

The capacitor 10 is, in effect, an open circuit for low frequency signals, such as dc signals, so that a greater negative feedback signal is applied over the negative feed-back circuit after the disc 18 has completed its rotation. The voltage gain of the amplifier 1 is approximately unity for low frequency signals. Accordingly, substantially the entire output pulse produced at the terminal 6 occurs during the rotation of the disc 18, and the leading edge of the output pulse is encoded in time position, relative to the beginning of the exposure period, in accordance with the intensity of the light reaching the phototransistor 7. The output pulse may be used to cause a solenoid to release the second blade of a two-bladed shutter in order to terminate the exposure. Alternatively, the pulse may be used to activate a solenoid to latch a mechanism which functions to progressively increase the size of the exposing aperture of the camera, during rotation of the disc 18, to select an aperture which is appropriate for a given shutter speed and scene brightness. In still another alternative arrangement, both the aperture and the shutter speed may be regulated together, and a combination of the two selected in accordance with the time position of the pulse produced on the output terminal 6. As apparatus for selecting various shutter speeds and aperture openings in response to time-encoded pulses are well known in the art, they need not be described in any more detail.

By means of the present invention the relatively high level of the dark current, illustrated by the level 21 in FIG. 2, does not affect the accuracy of the apparatus, that is, the time of occurrence of the output pulse produced by the amplifier 1. Greater accuracy in achieving proper exposures is therefore secured by use of the present invention.

In one embodiment of the present invention, the following were used for the components of the circuit of FIG. 1:

| | | |
|---|---|---|
| photoresponsive device 7 | | BPX63 |
| Diode 13 | | BA127 |
| resistors | 8 | 3M |
| do. | 9 | 1M |
| do. | 10 | 2.5K |
| do. | 12 | 10 |
| do. | 14 | 2.2K |
| capacitor | 10 | 100Mfd |

The disc 18 is preferably rotated for a single revolution during the exposure interval, and arrested in its rest position when a single revolution has been completed. In one embodiment, a single revolution of the disc 18 occupies approximately 20 milliseconds.

What is claimed is:

1. In a camera having a shutter and a device, means for exposing said photoresponsive device to light from a scene to be photographed, and means for varying the amount of such exposure during the open period of said camera shutter the combination comprising an amplifier with high pass characteristic, means for connecting an input of said amplifier with said photoresponsive device, and a threshold value detector connected with the output of said amplifier and adapted to respond to the signal produced at the output of said amplifier to produce a control signal adapted for use in effecting the setting of the exposure of the camera.

2. Apparatus according to claim 1 wherein said amplifier is an operational amplifier having inverting and non-inverting inputs, said inverting input being connected with said photo-responsive device, and including a negative feed-back network having a low-pass characteristic interconnected between the output of said amplifier and said inverting input.

3. Apparatus according to claim 2, wherein said threshold value detector produces said control signal when the output of said amplifier exceeds said threshold value.

4. Apparatus according to claim 3, including positive feedback means interconnecting the output of said amplifier to said non-inverting input.

5. Apparatus according to claim 4 wherein said positive feedback means includes an element having a non-linear current-voltage characteristic in which the rate of change in current flowing through such element as a result of a unit change in voltage drop across said element increases for increasing values of said voltage drop.

6. Apparatus according to claim 5, wherein said feedback element is a diode.

7. Apparatus according to claim 1, including a resistor connected between the output of said amplifier and an inverting input of said amplifier to furnish negative feedback to said inverting input, and a switch interconnected in parallel with said resistor, said switch being adapted to be opened at a predetermined instant after actuation of the camera release to initiate an exposure interval.

8. Apparatus according to claim 1, including an operating voltage source, and means for connecting said operational amplifier with said voltage source at the beginning of said exposure interval.

9. An electronic shutter control for a shutter, said control comprising a photoresponsive device, means for exposing said photoresponsive device to light from a scene to be photographed during the open period of said shutter, means for varying the amount of such exposure during an exposure period, an amplifier connected with said photoresponsive device for amplifying an electrical signal produced thereby in response to the light to which it is exposed, and means for selectively applying positive feedback to said amplifier when said electrical signal reaches a predetermined value, whereby said amplifier produces a pulse for controlling a shutter at a time coincident with said electrical signal reaching said predetermined value.

10. Apparatus according to claim 9, wherein said means for selectively applying positive feedback to said amplifier comprises a diode connected between the output of said amplifier and a non-inverting input of said amplifier.

11. In a camera having a photo-responsive device, means for exposing said photo-responsive device to light from a scene to be photographed, and means for varying the amount of such exposure during the exposure period of said camera, the combination comprising an operational amplifier with a high-pass characteristic, said amplifier having inverting and non-inverting inputs, means for connecting said inverting input of said amplifier with said photo-responsive device, a threshold value detector connected with the output of said amplifier and adapted to respond to the signal produced at the output of said amplifier to produce a control signal adapted for use in effecting the setting of the exposure of the camera, and a negative feedback network having a low-pass characteristic interconnected between the output of said amplifier and said inverting input, said negative feedback network comprising a pair of resistors interconnected in series between the output of said amplifier and said inverting input, and a series circuit including a resistor and a capacitor connected between the junction of said pair of resistors and a reference potential.

12. An electronic shutter control comprising a photo-responsive device, means for exposing said photo-responsive device to light from a scene to be photogaphed, means for varying the amount of such exposure during an exposure period, an amplifier connected with said photo-responsive device for amplifying an electrical signal produced thereby in response to the light to which it is exposed, a diode connected between the output of said amplifier and a non-inverting input of said amplifier for selectively applying positive feedback to said amplifier when said electrical signal reaches a predetermined value, whereby said amplifier produces a pulse for controlling a shutter at a time coincident with said electrical signal reaching said predetermined value, and a low-pass filter means for applying negative feedback to said amplifier for re-establishing a quiescent condition of operation following said pulse.

* * * * *